United States Patent
Huang et al.

(10) Patent No.: US 8,436,769 B2
(45) Date of Patent: May 7, 2013

(54) APPARATUS FOR PERFORMING GLOBAL NAVIGATION SATELLITE SYSTEM CONTROL, AND ASSOCIATED METHODS AND STORAGE MEDIA

(75) Inventors: Kung-Shuan Huang, Changhua County (TW); Ching-Hua Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 309 days.

(21) Appl. No.: 12/859,294

(22) Filed: Aug. 19, 2010

(65) Prior Publication Data

US 2012/0044107 A1 Feb. 23, 2012

(51) Int. Cl.
*G01S 19/05* (2010.01)
(52) U.S. Cl.
USPC .................................................. 342/357.42
(58) Field of Classification Search .............. 342/357.42
See application file for complete search history.

(56) References Cited

U.S. PATENT DOCUMENTS

| | | | |
|---|---|---|---|
| 6,389,291 B1 | 5/2002 | Pande et al. | |
| 6,462,708 B1 | 10/2002 | Tsujimoto et al. | |
| 6,519,466 B2 | 2/2003 | Pande et al. | |
| 7,009,555 B2 * | 3/2006 | Tsujimoto et al. | 342/357.43 |
| 7,577,448 B2 | 8/2009 | Pande et al. | |
| 7,647,055 B2 | 1/2010 | Gum et al. | |
| 8,154,442 B2 * | 4/2012 | Alanen et al. | 342/357.45 |
| 2009/0140918 A1 | 6/2009 | Syrjarinne et al. | |

FOREIGN PATENT DOCUMENTS

CN 101317101 A 12/2008

* cited by examiner

*Primary Examiner* — Harry Liu
(74) *Attorney, Agent, or Firm* — Winston Hsu; Scott Margo

(57) ABSTRACT

An apparatus for performing Global Navigation Satellite System (GNSS) control includes: a GNSS receiver arranged to obtain/calculate at least one position of the apparatus; and an assistance data provider implemented within the apparatus, wherein the assistance data provider is arranged to provide the GNSS receiver with assistance data for use of obtaining/calculating the at least one position, and the assistance data provider selectively selects a specific assistance mode from a plurality of assistance modes for the GNSS receiver according to at least one predefined rule, with the assistance data corresponding to the specific assistance mode. Associated methods and storage media are also provided.

19 Claims, 12 Drawing Sheets

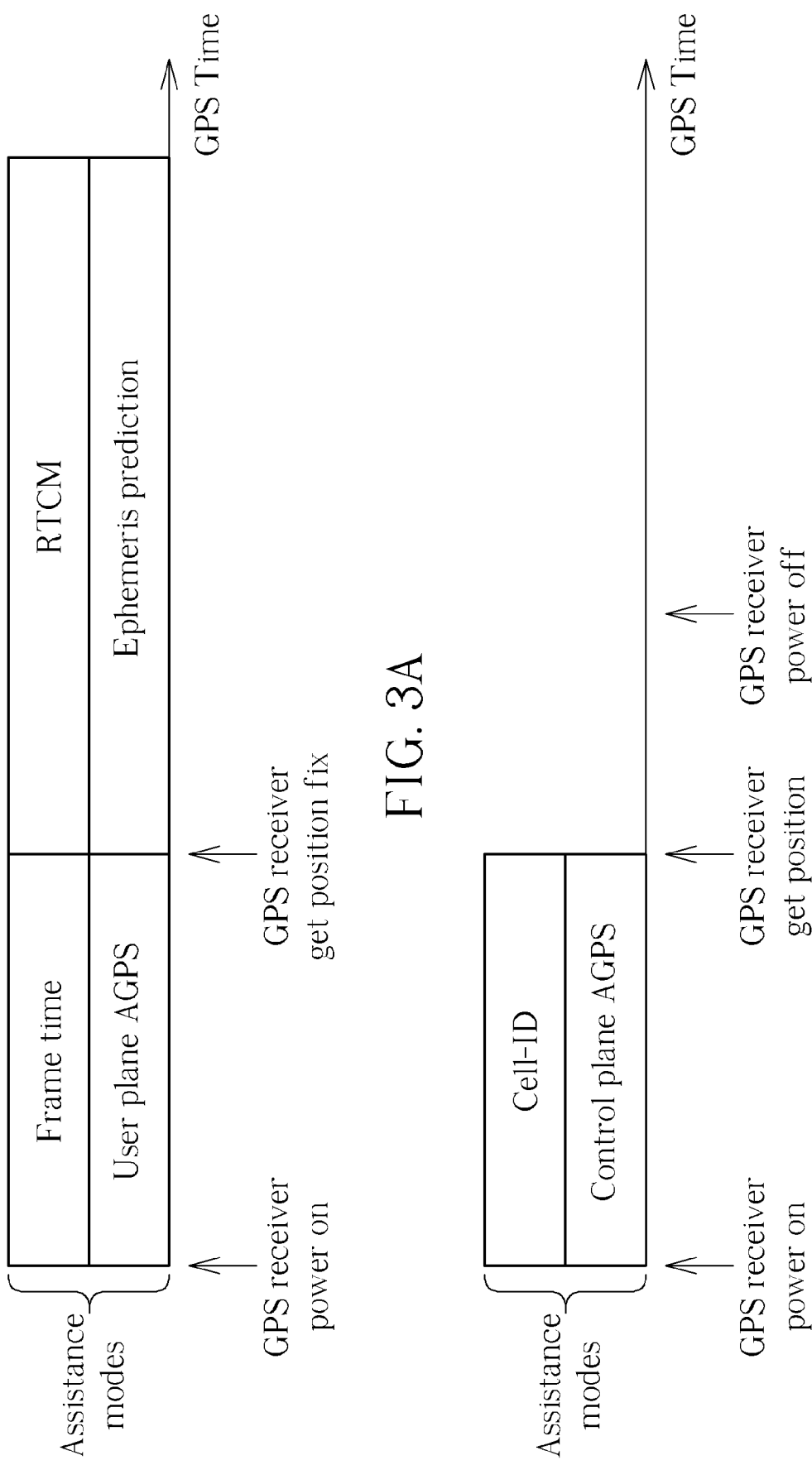

| D | SatID1 | SatID2 | ...... | SatIDn |
|---|--------|--------|--------|--------|

APPARATUS FOR PERFORMING GLOBAL NAVIGATION SATELLITE SYSTEM CONTROL, AND ASSOCIATED METHODS AND STORAGE MEDIA

BACKGROUND

The present invention relates to increasing the efficiency of obtaining assistance data, and more particularly, to apparatus for performing Global Navigation Satellite System (GNSS) control, and to associated methods and storage media.

In a conventional electronic device equipped with a GNSS receiver, a position calculation module therein may need assistance data for accelerating the Time to First Fix (TTFF) of the position of the conventional electronic device, where the assistance data is typically obtained from outside the conventional electronic device. When reviewing related products launched on the market, it seems unlikely that the related art architecture for obtaining the assistance data is properly designed. As a result, some problems may occur. For example, the performance of the position calculation module may be unacceptable due to improper or problematic assistance data. In another example, the calculation efficiency of the position calculation module may be decreased due to unexpected delay of obtaining assistance data. Thus, a novel method is required for properly controlling operations of obtaining assistance data.

SUMMARY

It is therefore an objective of the claimed invention to provide apparatus for performing Global Navigation Satellite System (GNSS) control, and to provide associated methods and storage media, in order to solve the above-mentioned problems.

An exemplary embodiment of an apparatus for performing GNSS control comprises: a GNSS receiver arranged to obtain/calculate at least one position of the apparatus; and an assistance data provider implemented within the apparatus, wherein the assistance data provider is arranged to provide the GNSS receiver with assistance data for use of obtaining/calculating the at least one position, and the assistance data provider selectively selects a specific assistance mode from a plurality of assistance modes for the GNSS receiver according to at least one predefined rule, with the assistance data corresponding to the specific assistance mode.

An exemplary embodiment of an associated method for performing GNSS control comprises: selecting a specific assistance mode from a plurality of assistance modes for a GNSS receiver according to at least one predefined rule; and providing the GNSS receiver with assistance data for use of obtaining/calculating at least one position, wherein the assistance data corresponds to the specific assistance mode.

An exemplary embodiment of an associated storage medium is provided, wherein the storage medium stores a program module for being executed within an apparatus comprising a GNSS receiver, and the program module comprises: a selector arranged to select a specific assistance mode from a plurality of assistance modes for the GNSS receiver according to at least one predefined rule; and a dispatcher arranged to provide the GNSS receiver with assistance data for use of obtaining/calculating at least one position, wherein the assistance data corresponds to the specific assistance mode.

An exemplary embodiment of an associated method for performing GNSS control comprises: selecting a specific assistance mode from a plurality of assistance modes for a GNSS receiver according to at least one predefined rule; and providing the GNSS receiver with assistance data for use of obtaining/calculating at least one position, wherein the assistance data corresponds to the specific assistance mode. In addition, the at least one predefined rule comprises at least one predefined priority setting rule, and the step of selecting the specific assistance mode from the plurality of assistance modes for the GNSS receiver according to the at least one predefined rule further comprises: receiving an assistance request bitmap; and selecting the specific assistance mode from the plurality of assistance modes according to the predefined priority setting rule and the assistance request bitmap.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3A-3C illustrate some assistance modes involved with the method shown in FIG. 2 according to different embodiments of the present invention.

FIG. 4B illustrates some exemplary fields of the assistance bitmap utilized by the apparatus shown in FIG. 4A according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
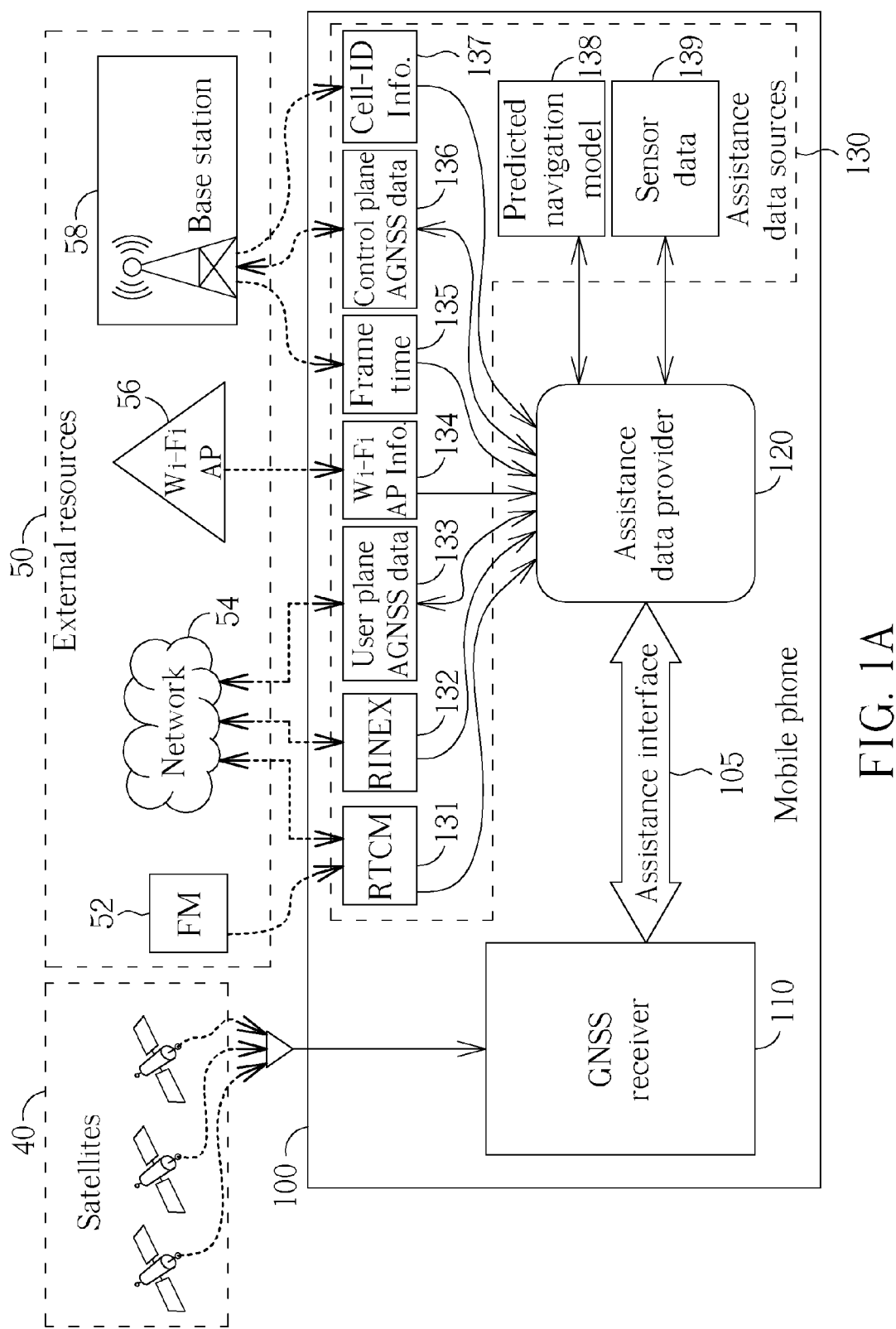
FIG. 1A is a diagram of an apparatus for performing Global Navigation Satellite System (GNSS) control according to a first embodiment of the present invention.

Please refer to FIG. 1A, which illustrates a diagram of an apparatus 100 for performing Global Navigation Satellite System (GNSS) control according to a first embodiment of the present invention, where a plurality of satellites 40 and external resources 50 such as a frequency modulation (FM) radio station 52 (labeled "FM"), a network 54, a Wireless Fidelity (Wi-Fi) access point 56 (labeled "Wi-Fi AP"), and a base station 58 are also illustrated for better comprehension. The apparatus 100 may comprise at least one portion (e.g. a portion or all) of an electronic device such as a multi-function mobile phone, a multi-function personal digital assistant (PDA), or a portable electronic device equipped with mobile phone and PDA functions. Here, the apparatus 100 shown in FIG. 1A is labeled "Mobile phone" since the multi-function mobile phone mentioned above is taken as an example of the apparatus 100 of this embodiment. This is for illustrative purposes only, and is not meant to be a limitation of the present invention. According to some variations of this embodiment, the apparatus 100 can be implemented as the multi-function PDA or the portable electronic device mentioned above. According to some other variations of this embodiment, the apparatus 100 can be implemented as other kinds of electronic devices.

As shown in FIG. 1A, the apparatus 100 comprises a GNSS receiver 110, an assistance data provider 120 that is capable of communicating with the GNSS receiver 110 through an assistance interface 105, and a plurality of assistance data sources 130. For example, the assistance data sources 130 may comprise a Radio Technical Commission for Maritime Services (RTCM) module 131 (labeled "RTCM"), a Receiver Independent Exchange Format (RINEX) module 132 (labeled "RINEX"), a user plane Assisted GNSS (AGNSS) data module 133 (labeled "User plane AGNSS data"), a Wi-Fi access point information module 134 (labeled "Wi-Fi AP Info."), a frame time module 135 (labeled "Frame time"), a control plane AGNSS data module 136 (labeled "Control plane AGNSS data"), a cell identification (cell-ID) information module 137 (labeled "Cell-ID Info."), a predicted navigation model module 138 (labeled "Predicted navigation model"), and a sensor data module 139 (labeled "Sensor data"). In practice, these modules can be implemented with software, firmware, and/or hardware modules, based upon different implementation choices. According to a variation of this embodiment, the assistance data provider 120 can be implemented with a program module executed by a controller (not shown in FIG. 1A) within the apparatus 100, and more particularly, the controller is positioned within the GNSS receiver 110 of this variation. In addition, according to different embodiments of the present invention, the GNSS receiver 110 can be a standalone or host based GNSS receiver.

According to the first embodiment, the GNSS receiver 110 is arranged to obtain/calculate at least one position of the apparatus 100. For example, the GNSS receiver 110 may obtain/calculate the position of the apparatus 100 according to signals received from the satellites 40. In practice, the GNSS receiver 110 may need assistance data for accelerating the Time to First Fix (TTFF) of obtaining/calculating the position of the apparatus 100 or improving the accuracy of the obtained/calculated position of the apparatus 100. The assistance data provider 120 is arranged to provide the GNSS receiver 110 with the assistance data for use of obtaining/calculating the aforementioned at least one position, where one or more specific module of the modules 131, 132, . . . , and 139 within the assistance data sources 130 can be selected as source(s) of the assistance data mentioned above in an efficient way.

In particular, the assistance data provider 120 may selectively select a specific assistance mode from a plurality of assistance modes for the GNSS receiver 110 according to at least one predefined rule, with the assistance data corresponding to the specific assistance mode. For example, according to the aforementioned at least one predefined rule, the assistance data provider 120 may select none of the plurality of assistance modes. In another example, according to the aforementioned at least one predefined rule, the assistance data provider 120 may select at least one assistance mode of the plurality of assistance modes as the specific assistance mode. In this embodiment, the assistance modes may comprise an RTCM assistance mode 131M, a RINEX assistance mode 132M, a user plane AGNSS assistance mode 133M, a Wi-Fi access point information assistance mode 134M, a frame time assistance mode 135M, a control plane AGNSS assistance mode 136M, a cell-ID assistance mode 137M, a predicted navigation model assistance mode 138M, and a sensor data assistance mode 139M respectively corresponding to the modules 131, 132, . . . , and 139 within the assistance data sources 130.

More specifically, given that an index i is a positive integer falling within the range of the interval [1, 9] in this embodiment, in a situation where the assistance data provider 120 selects an assistance mode "(130+i)M" from the assistance modes 131M, 132M, . . . , and 139M disclosed above as the specific assistance mode, the assistance data provider 120 selects the associated module (130+i) as the specific module mentioned above. For example, when i=1, 2, or 3 (which means the RTCM assistance mode 131M, the RINEX assistance mode 132M, or the user plane AGNSS assistance mode 133M is selected), the assistance data provider 120 may obtain the assistance data from an external network such as the network 54 through the RTCM module 131, the RINEX module 132, or the user plane AGNSS data module 133, respectively. In another example, when i=4 (which means the Wi-Fi access point information assistance mode 134M is selected), the assistance data provider 120 may obtain the assistance data from the Wi-Fi access point 56 through the Wi-Fi access point information module 134. Similarly, when i=5, 6, or 7 (which means the frame time assistance mode 135M, the control plane AGNSS assistance mode 136M, or the cell-ID assistance mode 137M is selected), the assistance data provider 120 may obtain the assistance data from the base station 58 through the frame time module 135, the control plane AGNSS data module 136, or the cell-ID information module 137, respectively. In addition, when i=8 (which means the predicted navigation model assistance mode 138M is selected), the assistance data provider 120 may obtain the assistance data from the predicted navigation model module 138. Additionally, when i=9 (which means the sensor data assistance mode 139M is selected), the assistance data provider 120 may obtain the assistance data from the sensor data module 139.

Please be noted that, in some embodiments, the assistance data provider 120 may obtain the assistance data by selecting more than one module from the modules 131-139. For example, the assistance data provider 120 may trigger/enable the frame time module 135 and the control plane AGNSS data module 136 simultaneously, and provide assistance data received from the frame time module 135 or the control plane AGNSS data module 136 to the GNSS receiver 110 through the assistance interface 105, depending on whether the frame time module 135 or the control plane AGNSS data module 136 replies more quickly/efficiently. There may be combined modes which are combinations of the abovementioned modes 131M-139M.

Regarding the RTCM assistance mode 131M, the RTCM module 131 can utilize the RTCM data as the assistance data, where the RTCM data is one kind of compact binary data which contains GNSS signal corrections measured by Differential Global Positioning System (DGPS) reference station.

Regarding the RINEX assistance mode 132M, there are several different file types, such as the observation file, the navigation file, the meteorological data file, etc., where the navigation file contains ephemeris data for satellites. Regarding the frame time assistance mode 135M, the frame time module 135 can utilize the wireless network signaling timing information as the assistance data. Regarding the user plane AGNSS assistance mode 133M, the user plane AGNSS data module 133 can utilize the assistance data that are transmitted over Internet Protocol-based (IP-based) connection (e.g. a connection using Secure User Plane for Location (SUPL) protocol). Regarding the control plane AGNSS assistance mode 136M, the control plane AGNSS data module 136 can utilize the assistance data that are transmitted via a circuit switched network. Regarding the cell-ID assistance mode 137M, the cell-ID information module 137 can utilize the cell-ID of a base station (e.g. the base station 58) as the assistance data, where the cell-ID provides a very rough location for the mobile phone. Regarding the Wi-Fi access point information assistance mode 134M, the Wi-Fi access point information module 134 can utilize the access point Media Access Control (MAC) address and the Receive Signal Strength Indicator (RSSI) information as the assistance data, where the access point MAC address and the RSSI information provide a rough location for the mobile phone. Regarding the predicted navigation model assistance mode 138M, the predicted navigation model module 138 can utilize the information of orbit, clock or health parameters prediction for GNSS satellites as the assistance data. Regarding the sensor data assistance mode 139M, the sensor data module 139 can utilize the data generated by sensors such as an accelerometer, a gyroscope, and a geomagnetic sensor as the assistance data.

In practice, the aforementioned at least one predefined rule may comprise a plurality of predefined rules such as an assistance priority profile rule (e.g. a rule regarding the assistance priority profile), an assistance power consumption rule (e.g. a rule regarding the assistance power consumption), an assistance data response time rule (e.g. a rule regarding the assistance data response time), a user preferred setting rule (e.g. a rule regarding the user preferred setting(s)), a system timing rule (e.g. a rule regarding the system timing), a GNSS satellite signal rule (e.g. a rule regarding the GNSS satellite signals), and a location based application rule (e.g. a rule regarding the location based applications).

Regarding the assistance priority profile rule, the assistance priority profile is a profile that specifies the priorities between those different assistance modes if they are concurrently available. For example, as a result of applying the assistance priority profile rule, an assistance mode that has higher priority than others will be selected as the specific assistance mode first. In addition, the assistance power consumption rule specifies the power consumption of obtaining assistance data for each assistance mode, and more particularly, specifies some specifications or thresholds regarding the power consumption. For example, as a result of applying the assistance power consumption rule, an assistance mode that causes lower power consumption than others will be selected as the specific assistance mode first. Regarding the assistance data response time rule, the assistance data response time means the length of time for getting the assistance data, and more particularly, defines some specifications or thresholds of getting the assistance data. For example, as a result of applying the assistance data response time rule, an assistance mode having a shorter response time than others will be selected as the specific assistance mode first. Regarding the user preferred setting rule, the user preferred setting allows the users to have preferences for some assistance modes. For example, as a result of applying the user preferred setting rule, the SUPL protocol may be chosen if the IP network is available. Regarding the system timing rule, the system timing means the timing for using at least one assistance mode (e.g. one or more of the assistance modes). For example, as a result of applying the system timing rule, there may be some parameters for determining/indicating what assistance mode(s) should be used in which time period. Regarding the GNSS satellite signal rule, it controls the assistance mode selection (i.e. the selection of assistance mode(s)) to depend on the current or past signal measurements. For example, as a result of applying the GNSS satellite signal rule, when the GNSS satellite signal currently available is weak, an assistance mode associated to a finer time resolution than others will be selected as the specific assistance mode first. Regarding the location based application rule, it controls the assistance mode selection to depend on current active location based applications. For example, as a result of applying the location based application rule, an assistance mode using broadcasting information may be selected as the specific assistance mode first when a current active location based application requires higher accuracy than others. In another example, as a result of applying the location based application rule, an assistance mode using predicted information may be selected as the specific assistance mode first when the current active location based application requires lower accuracy than others.

Based upon the architecture shown in FIG. 1A, the assistance data provider 120 implemented within the apparatus 100 can dynamically determine whether to utilize the modules 131, 132, . . . , and 139 within the assistance data sources 130 as the source of the assistance data, or dynamically select at least one of the modules 131, 132, . . . , and 139 as the source of the assistance data. As a result, the performance (e.g. the calculation accuracy or the time to fix) of the GNSS receiver 110 can be greatly enhanced. In addition, the GNSS receiver 110 can achieve the highest calculation efficiency available since the apparatus 100 can operate based upon its optimized configuration with the aid of the assistance data provider 120.

Figure 1B:
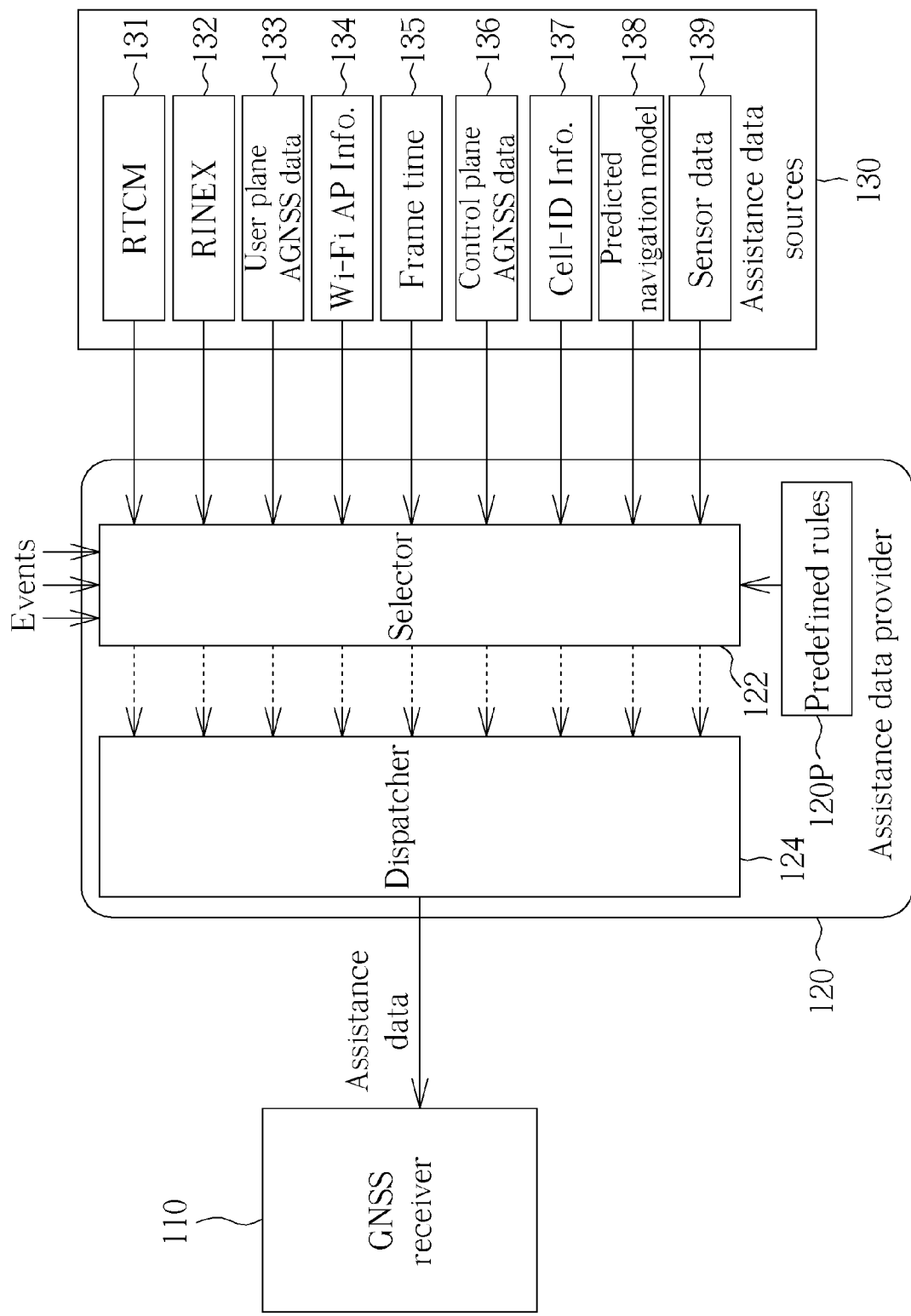
FIG. 1B illustrates some implementation details of the apparatus shown in FIG. 1A according to an embodiment of the present invention.

FIG. 1B illustrates some implementation details of the apparatus 100 shown in FIG. 1A according to an embodiment of the present invention. In this embodiment, the assistance data provider 120 can be implemented with a program module such as that mentioned above, where the program module can be executed by the controller mentioned above.

In particular, the apparatus 100 may comprise a storage medium (not shown in FIG. 1B) such as a non-volatile memory, where the storage medium stores the program module for being executed within the apparatus 100. As shown in FIG. 1B, the program module for implementing the assistance data provider 120 comprises a selector 122 and a dispatcher 124. Based upon at least one assistance event such as a plurality of events (labeled "Events" in FIG. 1B), the selector 122 is arranged to select the specific assistance mode from the plurality of assistance modes for the GNSS receiver 110 according to the aforementioned at least one predefined rule such as the plurality of predefined rules mentioned above (e.g. the predefined rules 120P). In addition, the dispatcher 124 is arranged to provide the GNSS receiver 110 with the assistance data for use of obtaining/calculating the aforementioned at least one position, where the assistance data corresponds to the specific assistance mode. For example, based upon the specific assistance mode selected by the selector 122, the dispatcher 124 obtains the assistance data from an external network through the specific module mentioned above in accordance with the selection performed by the selector 122.

Figure 2:
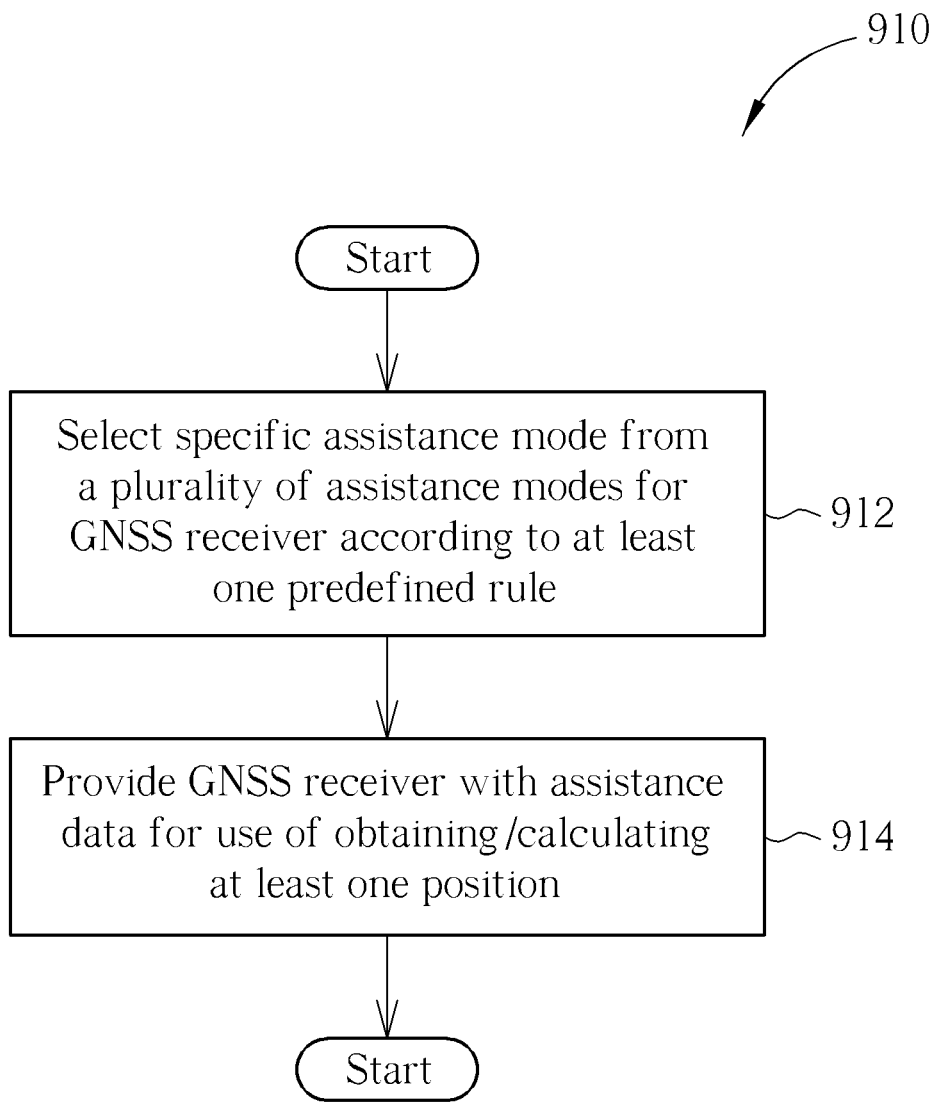
FIG. 2 is a flowchart of a method for performing GNSS control according to one embodiment of the present invention.

FIG. 2 is a flowchart of a method 910 for performing GNSS control according to one embodiment of the present invention. The method 910 can be applied to the apparatus 100 shown in FIG. 1A, and more particularly, can be applied to the assistance data provider 120. The method is described as follows.

In Step 912, the assistance data provider 120 (e.g. the selector 122 therein) is triggered by the event and selects a specific assistance mode, such as that mentioned above, from a plurality of assistance modes for the GNSS receiver 110 according to at least one predefined rule. For example, the plurality of assistance modes may comprise the assistance modes 131M, 132M, ..., and 139M mentioned above, and the selector 122 selects the specific assistance mode from the assistance modes 131M, 132M, ..., and 139M for the GNSS receiver 110 according to the aforementioned at least one predefined rule, such as the predefined rules disclosed in the first embodiment.

In Step 914, the assistance data provider 120 (e.g. the dispatcher 124 therein) provides the GNSS receiver 110 with assistance data, such as that mentioned above, for use of obtaining/calculating the aforementioned at least one position, where the assistance data corresponds to the specific assistance mode.

According to this embodiment, in Step 912, the assistance data provider 120 (e.g. the selector 122 therein) receives at least one assistance event to determine at least one assistance condition accordingly, compares the determined assistance condition with the aforementioned at least one predefined rule to generate at least one comparison result, and selects the specific assistance mode from the plurality of assistance modes for the GNSS receiver 110 according to the aforementioned at least one comparison result. Thus, according to the aforementioned at least one predefined rule, the assistance data provider 120 (e.g. the selector 122 therein) selects at least one assistance mode of the plurality of assistance modes as the specific assistance mode.

More particularly, the aforementioned at least one assistance event may comprise a plurality of assistance events such as a GNSS receiver power on/off event (e.g. an event of GNSS receiver power on, or an event of GNSS receiver power off), a GNSS receiver positioning status event (e.g. an event of GNSS receiver positioning status), a GNSS receiver assistance request event (e.g. an event of GNSS receiver assistance request(s)), a location based application request event (e.g. an event of location based application request(s)), a GNSS satellite signal measurement event (e.g. an event of GNSS satellite signal measurement(s)), and a timing tag event (e.g. an event of timing tag).

For example, the aforementioned at least one assistance condition may comprise a power on/off condition corresponding to the GNSS receiver power on/off event (e.g. a condition of power on, or a condition of power off), and further comprise a fix/no fix condition (e.g. a condition of fix, or a condition of no fix), a satellite in tracking/acquisition condition (e.g. a condition of satellite in tracking, or a condition of satellite in acquisition), and a collecting satellite navigation data condition (e.g. a condition of collecting satellite navigation data) respectively corresponding to the GNSS receiver positioning status event. In addition, the aforementioned at least one assistance condition may comprise an assistance request bitmap condition (e.g. a condition of using an assistance request bitmap) corresponding to the GNSS receiver assistance request event, and further comprise a location based service (LBS) condition (e.g. a condition of LBS, such as a condition of LBS on or a condition of LBS off), an emergency call condition (e.g. a condition of using an emergency call), and a navigation condition (e.g. a condition of navigation) respectively corresponding to the location based application request event. Additionally, the aforementioned at least one assistance condition may comprise an urban canyon condition (e.g. a condition of being in urban canyon) and a weak signal condition (e.g. a condition of having a weak signal) respectively corresponding to the GNSS satellite signal measurement event, and further comprise a system time tick condition (e.g. a condition of using the system time tick) and a GPS time of week (TOW) condition (e.g. a condition of using the GPS TOW) respectively corresponding to the timing tag event.

Figure 3C:
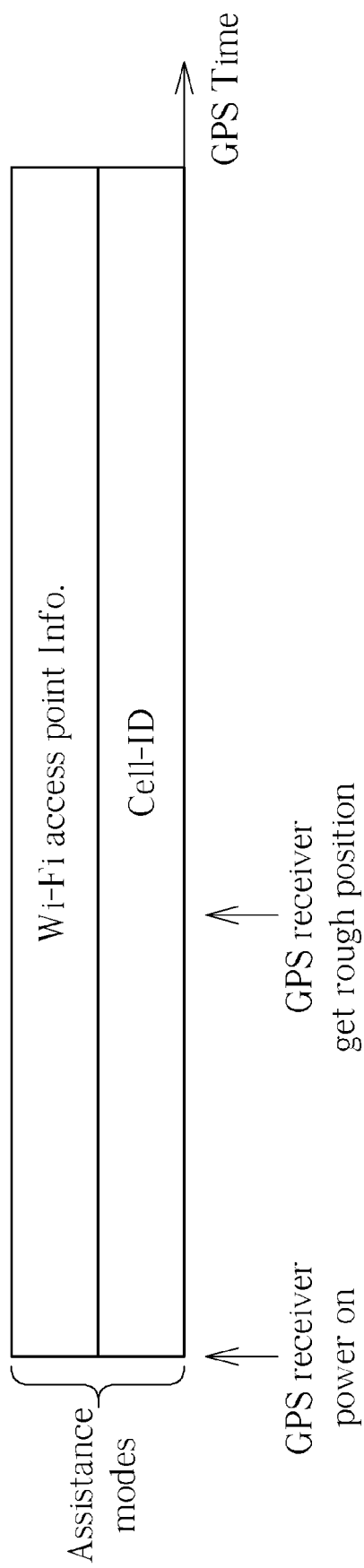

FIGS. 3A-3C illustrate some assistance modes involved with the method 910 shown in FIG. 2 according to different embodiments of the present invention. Please note that, in these embodiments, a GPS receiver 110' is taken as an example of the GNSS receiver 110 mentioned above, and therefore, the user plane AGNSS assistance mode 133M and the control plane AGNSS assistance mode 136M mentioned above can be referred to as the user plane AGPS assistance mode 133M' (labeled "User plane AGPS" in FIG. 3A) and the control plane AGPS assistance mode 136M' (labeled "Control plane AGPS" in FIG. 3B), respectively. In addition, the ephemeris prediction assistance mode 138M' (labeled "Ephemeris prediction" in FIG. 3A) is taken as an example of the predicted navigation model assistance mode 138M mentioned above. Additionally, the horizontal axis in these embodiments represents the GPS time, and therefore, is labeled "GPS Time" in FIGS. 3A-3C.

Referring to FIG. 3A, when a navigation application request and when the event of the GPS receiver power on is detected, the assistance data provider 120 enables the frame time assistance mode 135M (labeled "Frame time") and/or the user plane AGPS assistance mode 133M', and provides the GPS receiver 110' with the assistance data respectively corresponding to the frame time assistance mode 135M and/or the user plane AGPS assistance mode 133M'. In addition, when the event of the GPS receiver position fix (i.e. the event that the GPS receiver gets position fix) is detected, the assistance data provider 120 enables the RTCM assistance mode 131M (labeled "RTCM") and/or the ephemeris prediction assistance mode 138M', and provides the GPS receiver 110' with the assistance data respectively corresponding to the RTCM assistance mode 131M and/or the ephemeris prediction assistance mode 138M'.

Referring to FIG. 3B, when an emergency call request and when the event of the GPS receiver power on is detected, the assistance data provider 120 enables the cell-ID assistance mode 137M (labeled "Cell-ID") and/or the control plane AGPS assistance mode 136M', and provides the GPS receiver 110' with the assistance data respectively corresponding to the cell-ID assistance mode 137M and/or the control plane AGPS assistance mode 136M'. In addition, when the event that the GPS receiver gets the position is detected, the assistance data provider 120 disables the cell-ID assistance mode 137M and/or the control plane AGPS assistance mode 136M' since no assistance data is required. Afterward, the event of the GPS receiver power off is detected, and no assistance mode is enabled.

Referring to FIG. 3C, when a LBS application request and when the event of the GPS receiver power on is detected, the assistance data provider 120 enables the Wi-Fi access point information assistance mode 134M (labeled "Wi-Fi access point Info.") and/or the cell-ID assistance mode 137M (labeled "Cell-ID"), and provides the GPS receiver 110' with the assistance data respectively corresponding to the Wi-Fi access point information assistance mode 134M and/or the cell-ID assistance mode 137M. In addition, when the event that the GPS receiver gets a rough position is detected, the assistance data provider 120 does not disable the Wi-Fi access point information assistance mode 134M and/or the cell-ID assistance mode 137M since further operations of these modes are still required. When no further operation is required (e.g. when the LBS application is closed), the assistance data provider 120 disables the Wi-Fi access point information assistance mode 134M and/or the cell-ID assistance mode 137M.

Figure 4A:
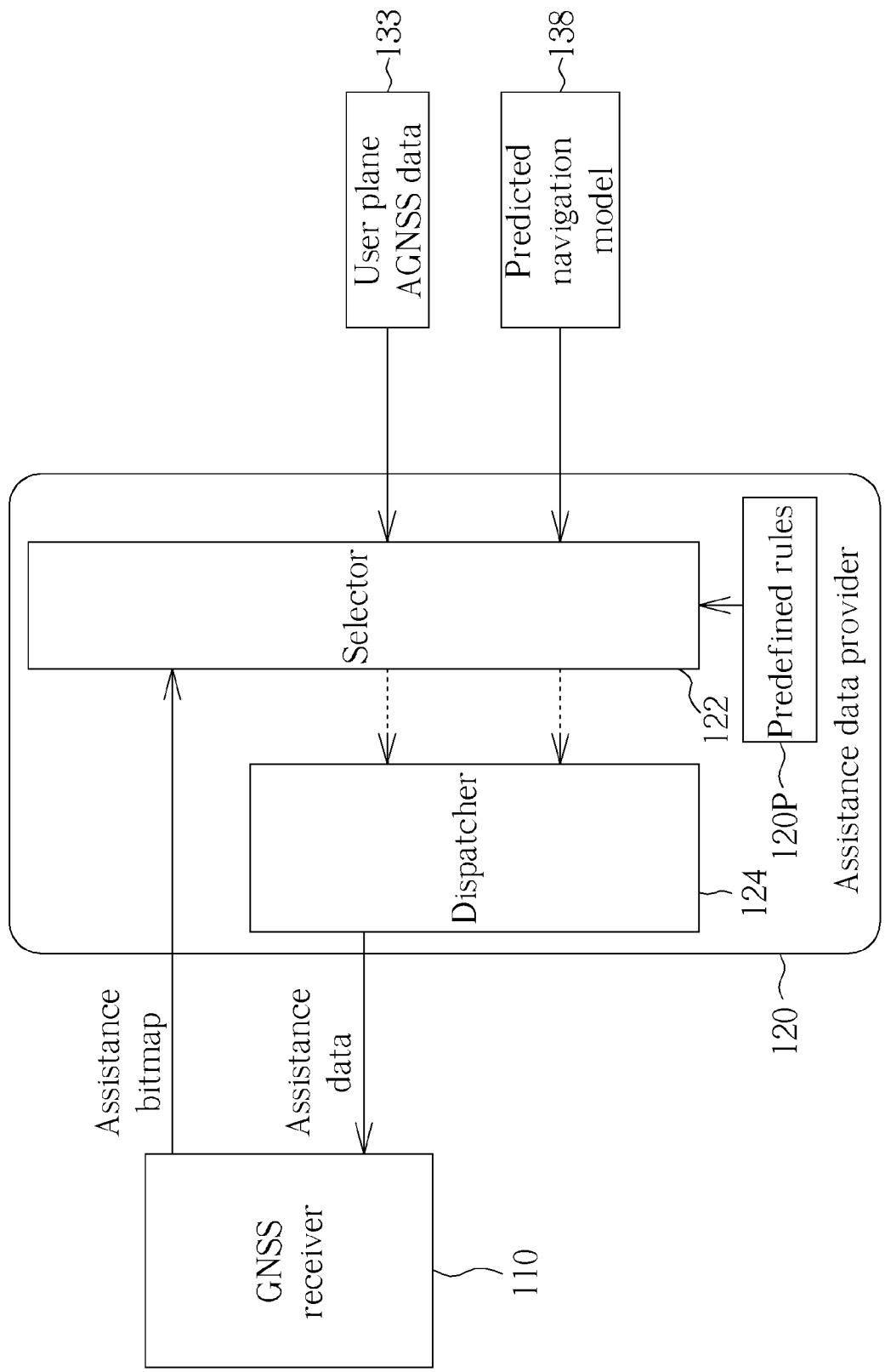
FIG. 4A illustrates some implementation details of the apparatus shown in FIG. 1A according to a second embodiment of the present invention, where this embodiment is a variation of the first embodiment.

FIG. 4A illustrates some implementation details of the apparatus 100 shown in FIG. 1A according to a second embodiment of the present invention, where this embodiment is a variation of the first embodiment. Please note that, within the assistance data sources 130 shown in FIG. 1A, only the user plane AGNSS data module 133 and the predicted navigation model module 138 are shown in the second embodiment. This is because in this embodiment it is assumed that, within the assistance modes 131M, 132M, . . . , and 139M disclosed above, only the user plane AGNSS assistance mode 133M and the predicted navigation model assistance mode 138M are available. That is, the assistance data that the assistance data provider 120 of this embodiment can provide is limited to the assistance data corresponding to the user plane AGNSS assistance mode 133M and the assistance data corresponding to the predicted navigation model assistance mode 138M.

Figure 4B:
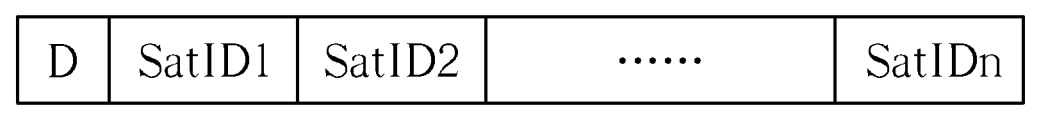

According to this embodiment, the aforementioned at least one predefined rule comprises at least one predefined priority setting rule (e.g. a rule regarding the predefined priority setting), such as the aforementioned assistance priority profile rule (e.g. the rule regarding the assistance priority profile specifying the priorities between those different assistance modes if they are concurrently available). More particularly, in Step 912, the assistance data provider 120 (e.g. the selector 122 therein) receives an assistance request bitmap (labeled "Assistance bitmap" in FIG. 4A, for simplicity), such as that mentioned above, and selects the specific assistance mode from the plurality of assistance modes according to the predefined priority setting rule, and according to the assistance request bitmap mentioned above. For example, according to the embodiment shown in FIG. 4B, the format of the assistance request bitmap can be expressed as follows:

{D, SatID1, SatID2, . . . , SatIDn};

Please note that the field D can be regarded as a navigation model request indicator arranged to notify of whether to request a navigation model, and the field(s) {SatID1, SatID2, . . . , SatIDn} can be regarded as a satellite Pseudo Random Noise (PRN) code list arranged to notify of the satellites to be requested for the navigation model. Additionally, except for the GNSS receiver assistance request event represented by the assistance request bitmap, no other assistance event is considered during the assistance mode selection in this embodiment. This is for illustrative purposes only, and is not meant to be a limitation of the present invention. According to some variations of this embodiment, in addition to the GNSS receiver assistance request event represented by the assistance request bitmap, one or more other assistance events may be considered during the assistance mode selection.

Figure 5:
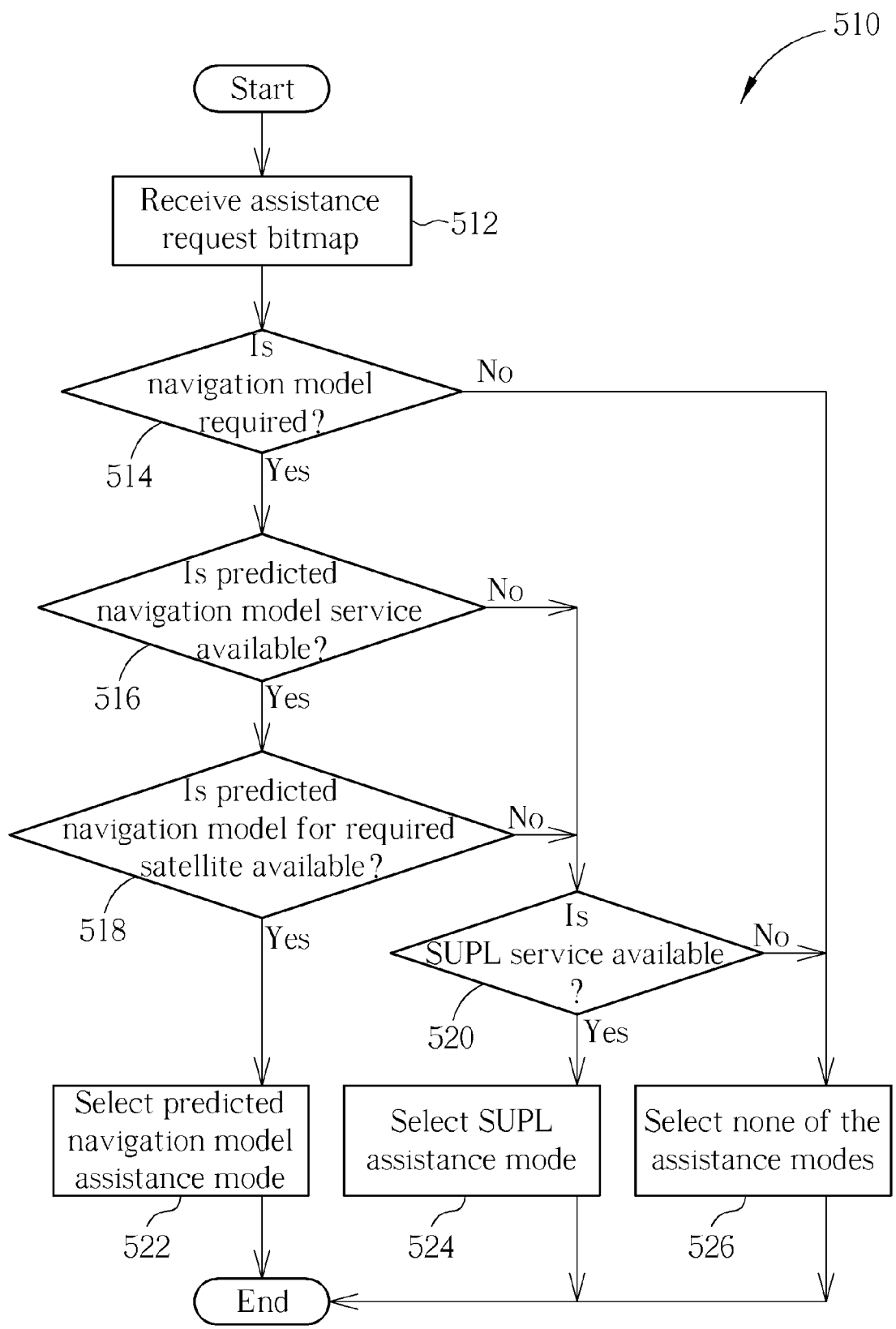
FIG. 5 illustrates some implementation details of the method shown in FIG. 2 according to an embodiment of the present invention, where the working flow shown in FIG. 5 can be applied to the apparatus shown in FIG. 4A.

FIG. 5 illustrates some implementation details of the method 910 shown in FIG. 2 according to an embodiment of the present invention, where the working flow 510 shown in FIG. 5 can be applied to the apparatus shown in FIG. 4A. For example, the predefined priority setting rule may indicate that a navigation model assistance mode such as the aforementioned predicted navigation model assistance mode 138M has higher priority than that of a SUPL protocol assistance mode, such as the aforementioned user plane AGNSS assistance mode 133M, when both modes are concurrently available.

In Step 512, the selector 122 receives the assistance request bitmap. In Step 514, the selector 122 determines whether a navigation model is required. When it is detected that the navigation model is required, Step 516 is entered; otherwise, Step 526 is entered. In Step 516, the selector 122 determines whether the predicted navigation model service is available. When it is detected that the predicted navigation model service is available, Step 518 is entered; otherwise, Step 520 is entered. In Step 518, the selector 122 determines whether the predicted navigation model for any required satellite (e.g. one or more required satellites) is available. When it is detected that the predicted navigation model for any required satellite is available, Step 522 is entered; otherwise, Step 520 is entered. In Step 520, the selector 122 determines whether the SUPL service is available. When it is detected that the SUPL service is available, Step 524 is entered; otherwise, Step 526 is entered. In Step 522, the selector 122 selects the predicted navigation model assistance mode 138M, for obtaining the assistance data corresponding to the predicted navigation model assistance mode 138M. In Step 524, the selector 122 selects the SUPL protocol assistance mode (which is simply referred to as "SUPL assistance mode" in FIG. 5), for obtaining the assistance data corresponding to the SUPL protocol assistance mode. In Step 526, the selector 122 selects none of the assistance modes.

FIGS. 6A-6D illustrate some varied versions of the working flow 510 shown in FIG. 5 with some steps being respectively omitted in exemplary situations according to different embodiments of the present invention. For example, the working flow 610A shown in FIG. 6A and the working flow 610B shown in FIG. 6B can be derived from omitting some steps of the working flow 510 shown in FIG. 5 and altering at least one step of the working flow 510, respectively. In another example, the working flow 610C shown in FIG. 6C can be derived from omitting at least one step of the working flow 510 and altering some other steps of the working flow 510. In another example, the working flow 610D shown in FIG. 6D can be derived from omitting some steps of the working flow 510 and altering some other steps of the working flow 510.

Figure 6A:
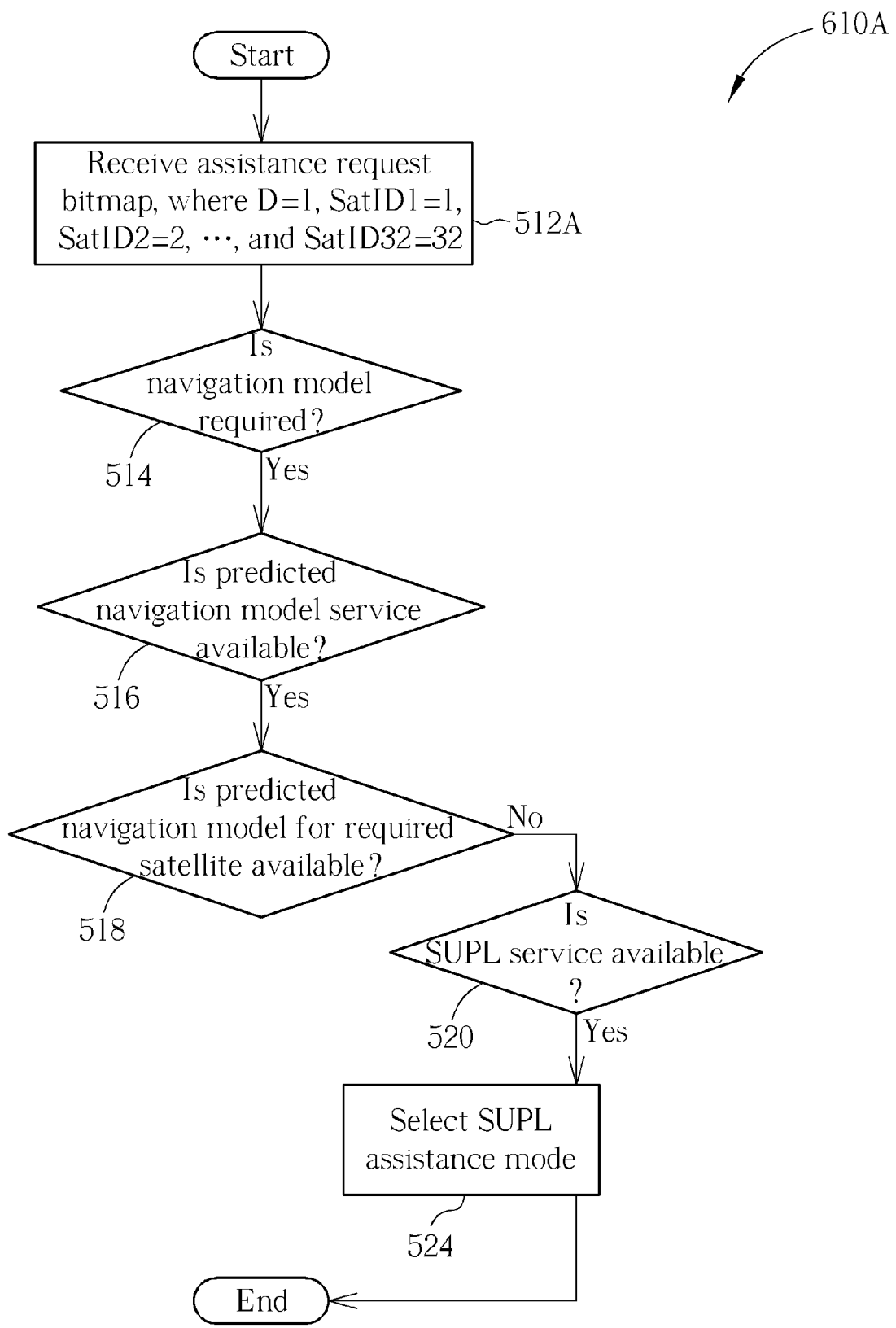
FIGS. 6A-6D illustrate some varied versions of the working flow shown in FIG. 5 with some steps being respectively omitted in exemplary situations according to different embodiments of the present invention.

Referring to FIG. 6A, Step 512A is altered from Step 512 in a situation where D=1, SatID1=1, SatID2=2, . . . , and SatID32=32, which means the navigation model is required and the number of satellites to be requested for the navigation model is equal to 32, given that the field D is utilized for indicating whether the navigation model is required and the number of the satellites to be requested for the navigation model can be obtained from observing the length of the satellite PRN code list mentioned above. As a result, Step 516 is entered after Step 514 is executed. In a situation where it is detected that the predicted navigation model service is available, Step 518 is entered. In addition, in a situation where it is detected that the predicted navigation model for any required satellite is not available, Step 520 is entered. Additionally, in a situation where it is detected that the SUPL service is available, Step 524 is entered. As a result, the selector 122 selects the SUPL protocol assistance mode (which is simply referred to as "SUPL assistance mode" in FIG. 6A), for obtaining the assistance data corresponding to the SUPL protocol assistance mode.

Figure 6B:
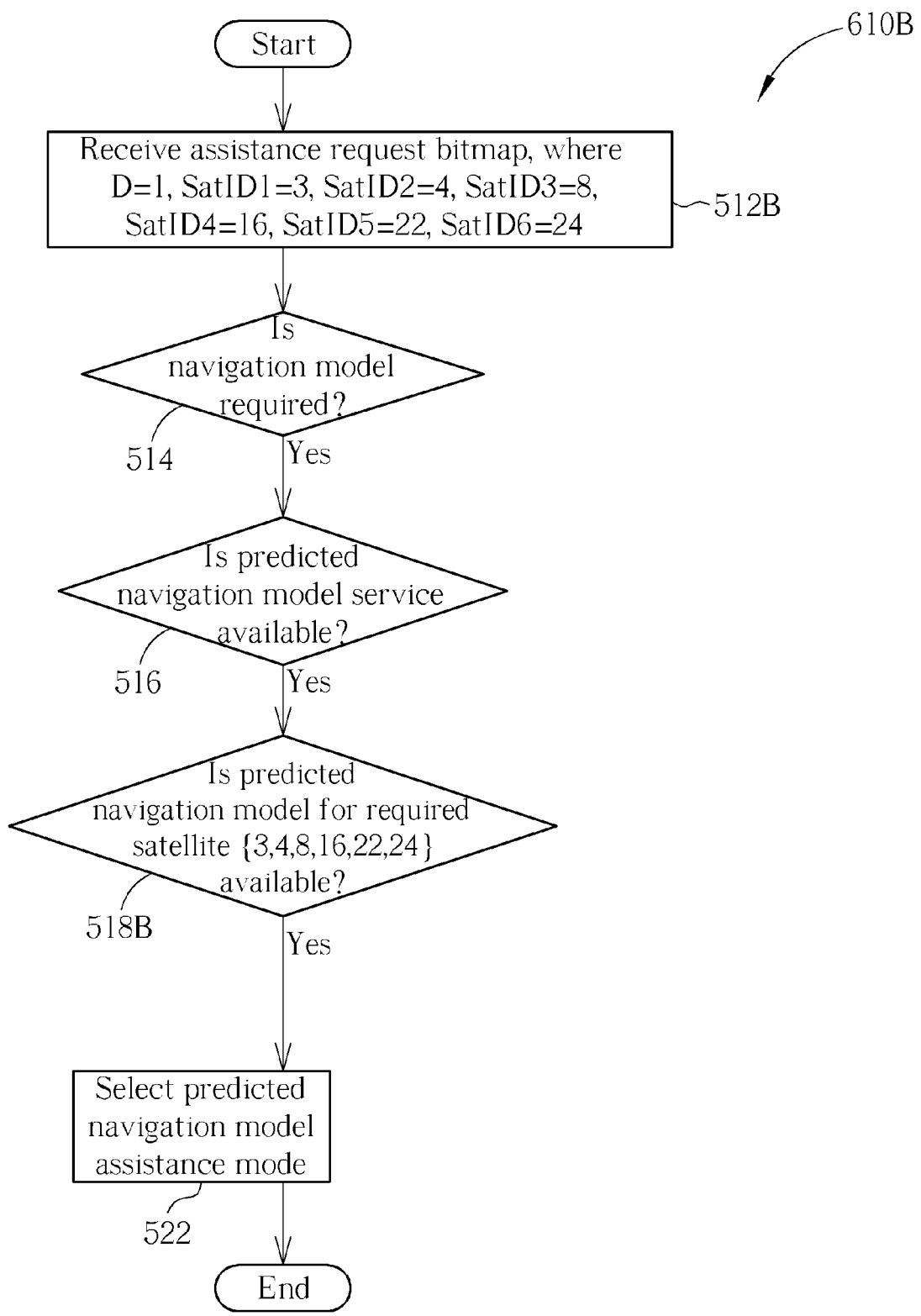

Referring to FIG. 6B, Step 512B is altered from Step 512 in a situation where D=1, SatID1=3, SatID2=4, SatID3=8, SatID4=16, SatID5=22, and SatID6=24, which means the navigation model is required and the number of satellites to be requested for the navigation model is equal to 6, and the satellite PRN code list is {3, 4, 8, 16, 22, 24}. As a result, Step 516 is entered after Step 514 is executed. In a situation where it is detected that the predicted navigation model service is available, Step 518B is entered, where Step 518B is altered from Step 518 based upon the satellite PRN code list {3, 4, 8, 16, 22, 24}. In addition, in a situation where it is detected that the predicted navigation model for each of the required satellites {3, 4, 8, 16, 22, 24} is available, Step 522 is entered. As a result, the selector 122 selects the predicted navigation model assistance mode 138M, for obtaining the assistance data corresponding to the predicted navigation model assistance mode 138M with respect to the satellites {3, 4, 8, 16, 22, 24}.

Figure 6C:
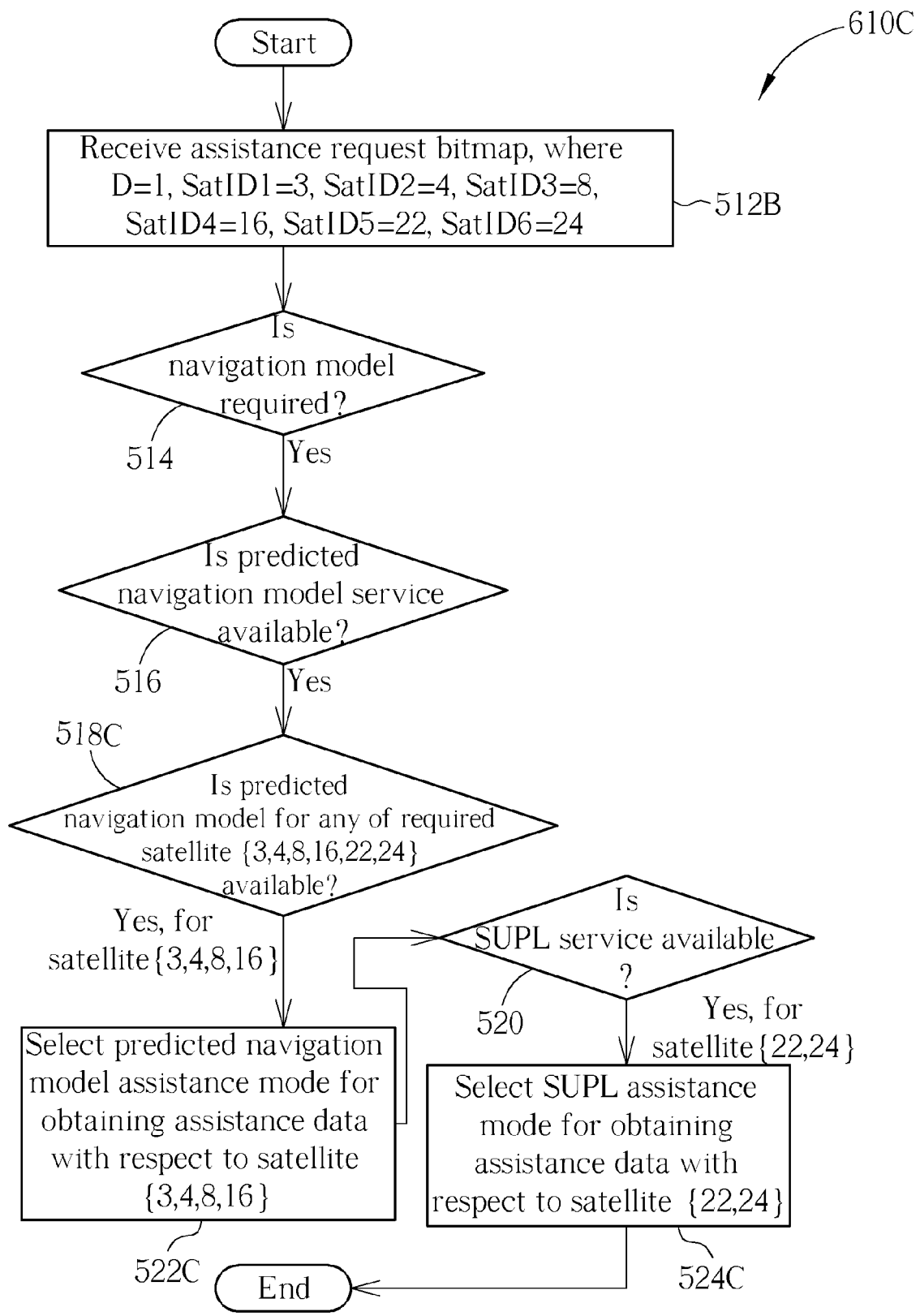

Referring to FIG. 6C, Step 512B (which is the same as that mentioned in the embodiment shown in FIG. 6B) is executed in a situation where D=1, SatID1=3, SatID2=4, SatID3=8, SatID4=16, SatID5=22, and SatID6=24. As a result, Step 516 is entered after Step 514 is executed. In a situation where it is detected that the predicted navigation model service is available, Step 518C is entered, where Step 518C is altered from Step 518 based upon the satellite PRN code list {3, 4, 8, 16, 22, 24}. In addition, in a situation where it is detected that the predicted navigation model for each of the required satellites {3, 4, 8, 16} is available (and that the predicted navigation model for each of the required satellites {22, 24} is not available), Step 522C is entered, where Step 522C is altered from Step 522 based upon the partial satellite PRN code list {3, 4, 8, 16} corresponding to the satellites whose predicted navigation models are available. In Step 522C, the selector 122 selects the predicted navigation model assistance mode 138M for obtaining the assistance data with respect to the satellites {3, 4, 8, 16}. Afterward, Step 520 is entered. In a situation where it is detected that the SUPL service is available for the remaining satellites {22, 24} within the satellite PRN code list {3, 4, 8, 16, 22, 24}, Step 524C is entered, where Step 524C is altered from Step 524 based upon the partial satellite PRN code list {22, 24} corresponding to the remaining satellites whose SUPL service is available. In Step 524C, the selector 122 selects the SUPL protocol assistance mode (which is simply referred to as "SUPL assistance mode" in FIG. 6C) for obtaining the assistance data with respect to the satellites {22, 24}.

Please note that, as the number of satellites whose predicted navigation models are available is equal to 4 in this embodiment, the information of the predicted navigation models is typically sufficient for obtaining the position, where Step 520 and Step 524C can be utilized for further increasing the accuracy of obtaining the position. This is for illustrative purposes only, and is not meant to be a limitation of the present invention. According to a variation of this embodiment, in a situation where the number of satellites whose predicted navigation models are available is equal to or greater than 4, Step 520 and Step 524C can be omitted since the information of the predicted navigation models is typically sufficient for obtaining the position. According to another variation of this embodiment, in a situation where the number of satellites whose predicted navigation models are available is less than 4, Step 520 and Step 524C should not be omitted.

Figure 6D:
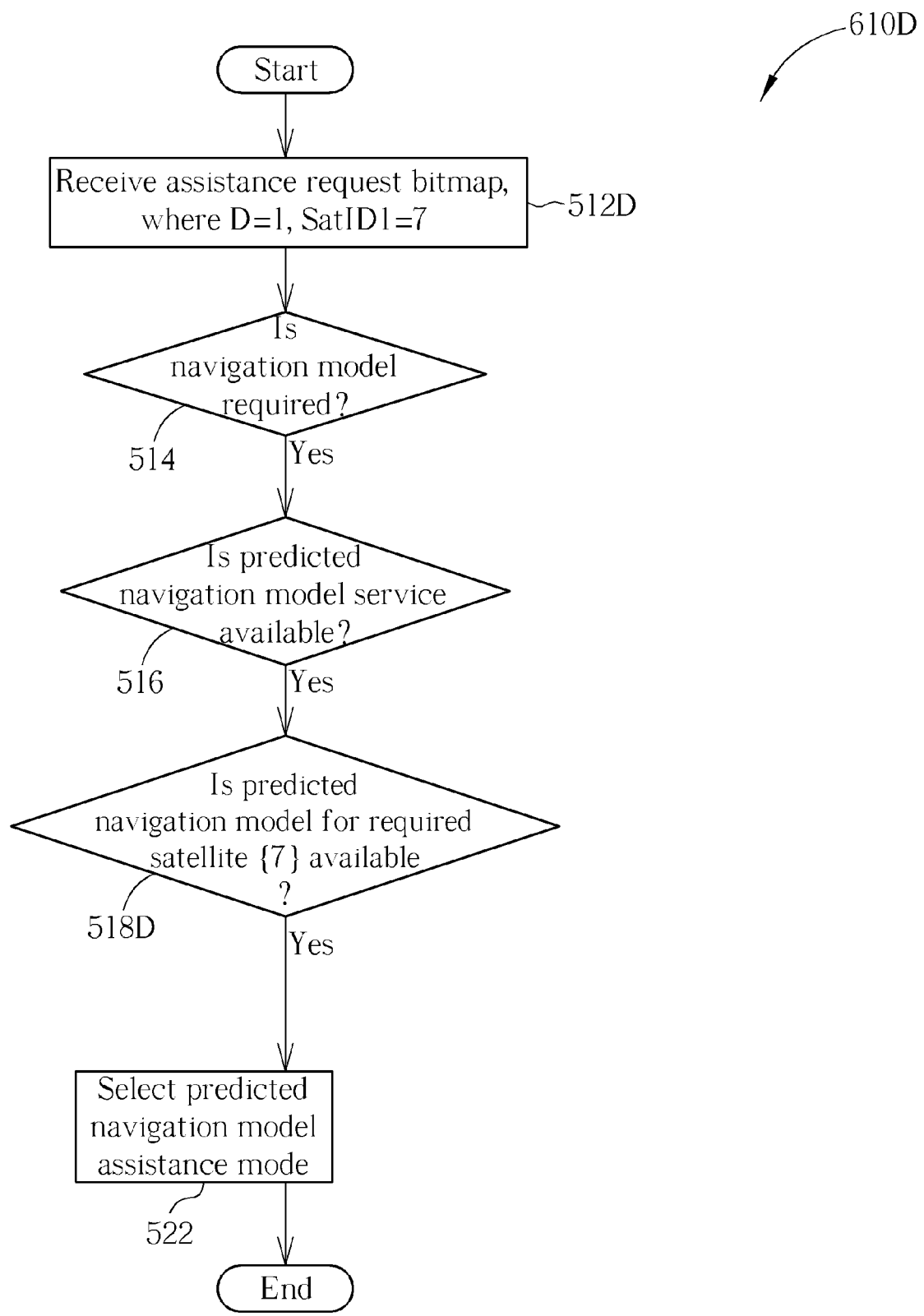

Referring to FIG. 6D, Step 512D is altered from Step 512 in a situation where D=1, and SatID1=7, which means the navigation model is required and the number of satellites to be requested for the navigation model is equal to 1, and the satellite PRN code list is {7}. As a result, Step 516 is entered after Step 514 is executed. In a situation where it is detected that the predicted navigation model service is available, Step 518D is entered, where Step 518D is altered from Step 518 based upon the satellite PRN code list {7}. In addition, in a situation where it is detected that the predicted navigation model for each of the required satellites {7} is available, Step 522 is entered. As a result, the selector 122 selects the predicted navigation model assistance mode 138M, for obtaining the assistance data corresponding to the predicted navigation model assistance mode 138M with respect to the satellite {7}.

It is an advantage of the present invention that the assistance data provider of any of the embodiments/variations disclosed above can dynamically select the specific assistance mode from the plurality of assistance modes or select none of the plurality of assistance modes, and can further properly provide the GNSS receiver with the assistance data for use of obtaining/calculating at least one position. As a result of implementing based upon the present invention apparatus and the associated methods thereof, the related art problem of unacceptable performance due to improper or problematic assistance data will no longer be an issue. In addition, the calculation efficiency of the GNSS receiver can be optimized in respective situations, giving high flexibility of GNSS control.

Those skilled in the art will readily observe that numerous modifications and alterations of the device and method may be made while retaining the teachings of the invention.

What is claimed is:

1. An apparatus for performing Global Navigation Satellite System (GNSS) control, comprising:
    a GNSS receiver arranged to obtain at least one position of the apparatus; and
    an assistance data provider implemented within the apparatus, wherein the assistance data provider is arranged to provide the GNSS receiver with assistance data for use of obtaining the at least one position, and the assistance data provider selectively selects a specific assistance mode from a plurality of assistance modes for the GNSS receiver according to at least one predefined rule, with the assistance data corresponding to the specific assistance mode;
    wherein the assistance data is necessary for the GNSS receiver to obtain the at least one position.

2. The apparatus of claim 1, wherein the assistance data provider is implemented with a program module executed by a controller within the apparatus.

3. The apparatus of claim 2, wherein the controller is positioned within the GNSS receiver.

4. The apparatus of claim 1, wherein according to the at least one predefined rule, the assistance data provider selects at least one assistance mode of the plurality of assistance modes as the specific assistance mode.

5. The apparatus of claim 1, wherein the assistance data provider obtains the assistance data from an external network.

6. The apparatus of claim 1, wherein the assistance modes comprise a Radio Technical Commission for Maritime Services (RTCM) assistance mode, a Receiver Independent Exchange Format (RINEX) assistance mode, a frame time assistance mode, a user plane Assisted GNSS (AGNSS) assistance mode, a control plane AGNSS assistance mode, a cell identification (cell-ID) assistance mode, a Wireless Fidelity (Wi-Fi) access point information assistance mode, a predicted navigation assistance model assistance mode, and/or a sensor data assistance mode.

7. The apparatus of claim 1, wherein the at least one predefined rule comprise an assistance priority profile rule, an assistance power consumption rule, a user preferred setting rule, a system timing rule, a GNSS satellite signal rule, and/or a location based application rule.

8. A method for performing Global Navigation Satellite System (GNSS) control, comprising:
  selecting a specific assistance mode from a plurality of assistance modes for a GNSS receiver according to at least one predefined rule; and
  providing the GNSS receiver with assistance data for use of obtaining at least one position, wherein the assistance data corresponds to the specific assistance mode;
  wherein the assistance data is necessary for the GNSS receiver to obtain the at least one position.

9. The method of claim 8, wherein the step of selecting the specific assistance mode from the plurality of assistance modes for the GNSS receiver according to the at least one predefined rule further comprises:
  receiving at least one assistance event to determine at least one assistance condition accordingly;
  comparing the determined assistance condition with the at least one predefined rule to generate at least one comparison result; and
  selecting the specific assistance mode from the plurality of assistance modes for the GNSS receiver according to the at least one comparison result.

10. The method of claim 9, wherein the at least one assistance event comprises a GNSS receiver power on/off event, a GNSS receiver positioning status event, a location based application request event, a GNSS satellite signal measurement event, and/or a timing tag event.

11. The method of claim 9, wherein the at least one assistance condition comprises a power on/off condition, a fix/no fix condition, a satellite in tracking/acquisition condition, a collecting satellite navigation data condition, an assistance request bitmap condition, a location based service (LBS) condition, an emergency call condition, a navigation condition, an urban canyon condition, a weak signal condition, a Global Positioning System (GPS) time tick condition, and/or a GPS time of week (TOW) condition.

12. The method of claim 8, wherein the step of selecting the specific assistance mode from the plurality of assistance modes for the GNSS receiver according to the at least one predefined rule further comprises:
  according to the at least one predefined rule, selecting at least one assistance mode of the plurality of assistance modes as the specific assistance mode.

13. A storage medium, which is a non-transitory tangible medium, wherein the storage medium stores a program module for being executed within an apparatus comprising a Global Navigation Satellite System (GNSS) receiver, and the program module comprises:
  a selector arranged to select a specific assistance mode from a plurality of assistance modes for the GNSS receiver according to at least one predefined rule; and
  a dispatcher arranged to provide the GNSS receiver with assistance data for use of obtaining at least one position, wherein the assistance data corresponds to the specific assistance mode;
  wherein the assistance data is necessary for the GNSS receiver to obtain the at least one position.

14. The storage medium of claim 13, wherein based upon at least one assistance event, the selector is arranged to select the specific assistance mode from the plurality of assistance modes for the GNSS receiver according to the at least one predefined rule.

15. The storage medium of claim 13, wherein based upon the specific assistance mode selected by the selector, the dispatcher obtains the assistance data from an external network.

16. A method for performing Global Navigation Satellite System (GNSS) control, comprising:
  selecting a specific assistance mode from a plurality of assistance modes for a GNSS receiver according to at least one predefined rule, wherein the at least one predefined rule comprises at least one predefined priority setting rule, and the step of selecting the specific assistance mode from the plurality of assistance modes for the GNSS receiver according to the at least one predefined rule further comprises:
    receiving an assistance request bitmap; and
    selecting the specific assistance mode from the plurality of assistance modes according to the predefined priority setting rule and the assistance request bitmap; and
  providing the GNSS receiver with assistance data for use of obtaining at least one position, wherein the assistance data corresponds to the specific assistance mode;
  wherein the assistance data is necessary for the GNSS receiver to obtain the at least one position.

17. The method of claim 16, wherein the assistance request bitmap comprises:
  a navigation model request indicator arranged to notify of whether to request a navigation model; and
  a satellite Pseudo Random Noise (PRN) code list arranged to notify of satellites to be requested for the navigation model.

18. The method of claim 16, wherein the predefined priority setting rule indicates that a navigation model assistance mode has higher priority than that of a Secure User Plane for Location (SUPL) protocol assistance mode.

19. The method of claim 16, wherein the step of selecting the specific assistance mode from the plurality of assistance modes for the GNSS receiver according to the at least one predefined rule further comprises:
  receiving at least one assistance event to determine at least one assistance condition accordingly;
  comparing the determined assistance condition with the at least one predefined rule to generate at least one comparison result; and
  selecting the specific assistance mode from the plurality of assistance modes for the GNSS receiver according to the at least one comparison result.

* * * * *